United States Patent
Shimizu et al.

(10) Patent No.: US 8,665,501 B2
(45) Date of Patent: Mar. 4, 2014

(54) LIGHT SCANNING DEVICE AND IMAGE FORMING DEVICE

(75) Inventors: Takeshi Shimizu, Chino (JP); Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 104 days.

(21) Appl. No.: 13/467,476

(22) Filed: May 9, 2012

(65) Prior Publication Data
US 2012/0287481 A1    Nov. 15, 2012

(30) Foreign Application Priority Data
May 10, 2011   (JP) .................................. 2011-105012

(51) Int. Cl.
*H04N 1/04* (2006.01)
(52) U.S. Cl.
USPC ............ 358/475; 358/474; 358/486; 358/498
(58) Field of Classification Search
USPC .................... 358/475, 474, 486, 498
See application file for complete search history.

(56) References Cited

U.S. PATENT DOCUMENTS 6,937,372 B2    8/2005   Kandori et al.
8,519,324 B2 *  8/2013   Tsuida ........................ 250/235

FOREIGN PATENT DOCUMENTS

JP       2003-131151        5/2003

* cited by examiner

*Primary Examiner* — Houshang Safaipour
(74) *Attorney, Agent, or Firm* — Harness, Dickey & Pierce, P.L.C.

(57) ABSTRACT

A light scanning device includes a movable section having a light reflecting section adapted to reflect light, oscillating around an oscillation axis, and having a variable magnitude of a maximum deflection angle of the oscillating, and a detection section adapted to detect the maximum deflection angle of the movable section, and the detection section includes a light source adapted to emit light to the light reflecting section, a light receiving section adapted to receive reflected light, which is the light emitted from the light source and then reflected by the light reflecting section, and a displacement driving section adapted to change a position of the light source in accordance with the maximum deflection angle of the movable section.

18 Claims, 7 Drawing Sheets

LIGHT SCANNING DEVICE AND IMAGE FORMING DEVICE

BACKGROUND

1. Technical Field

The present invention relates to a light scanning device and an image forming device.

2. Related Art

As a device of displaying a desired image (e.g., a commercial advertisement such as a commercial) on a screen, for example, there has been known a device, which is configured so as to respectively scan a laser beam emitted from a light source in horizontal and vertical directions of the screen using two galvanometer mirrors (see, e.g., JP-A-2003-131151). Further, in the device described in the related art document described above, the drive timing of each of the galvanometer mirrors is controlled by the detection signal of the optical sensor fixed on the screen. Further, it is also possible to obtain the maximum deflection angle of the galvanometer mirrors based on the detection signal of the optical sensor.

However, in the device described in the related art document described above, since the optical sensor is fixed with respect to the screen in the case of changing the size of the image on the screen by changing the maximum deflection angle of the galvanometer mirror, the detection accuracy of the optical sensor is apt to degrade depending on the level (in particular the case of a large deflection angle) of the maximum deflection angle of the galvanometer mirrors. In the case in which, for example, the maximum deflection angle is 40 degrees, and the optical sensor is disposed at the position where the optical sensor reacts the maximum deflection angle with the highest sensitivity, if the maximum deflection angle is changed to 80 degrees, the resolution of the deflection angle which can be detected by the optical sensor is degraded. As described above, according to the device described in the related art document described above, there arises a problem that the difference is caused in the detection accuracy of the maximum deflection angle, and it is unachievable to accurately detect the fact that the galvanometer mirror rotates (swings) at the maximum deflection angle to thereby control the galvanometer mirror.

SUMMARY

An advantage of some aspects of the invention is to provide a light scanning device and an image forming device capable of keeping the detection accuracy of the maximum deflection angle of a movable section even if the maximum deflection angle is changed.

Application Example 1

This application example is directed to a light scanning device including a movable section having a light reflecting section adapted to reflect light, oscillating around an oscillation axis, and having a variable magnitude of a maximum deflection angle of the oscillating, and a detection section adapted to detect the maximum deflection angle of the movable section, and the detection section includes a light source adapted to emit light to the light reflecting section, a light receiving section adapted to receive reflected light, which is the light emitted from the light source and then reflected by the light reflecting section, and a displacement driving section adapted to change a position of the light source in accordance with the maximum deflection angle of the movable section.

According to this application example, the light scanning device is provided with the movable section and the detection section. The movable section has the light reflecting section for reflecting the light, and is oscillated around the oscillation axis. Therefore, when irradiating the light reflecting section with the light, the light reflected by the light reflecting section is scanned. Further, the maximum deflection angle of the movable section is arranged to be variable. The detection section has the light source, the light receiving section, and the displacement driving section. Further, the light source emits the light to the light reflecting section, and the light receiving section receives the reflected light reflected by the light reflecting section. By the light receiving section receiving the reflected light, the detection section detects the maximum deflection angle of the movable section. When changing the magnitude of the maximum deflection angle of the rotation, the displacement driving section changes the position of the light source. Therefore, the position of the light source can be changed even when changing the maximum deflection angle of the movable section. Therefore, the detection accuracy of the maximum deflection angle can be kept even when changing the maximum deflection angle of the movable section.

Application Example 2

In the light scanning device according to the application example described above, it is preferable that assuming that the maximum deflection angle is $\theta_{max}$, and an angle formed by the light source, the oscillation axis of the movable section, and the light receiving section is $2\theta_0$, the displacement driving section changes the position of the light source so that a ratio $\theta_{max}/\theta_0$ between $\theta_{max}$ and $\theta_0$ becomes constant.

According to this configuration, the displacement driving section changes the position of the light source even when changing the maximum deflection angle of the movable section. Further, the ratio between a half of the angle formed by the light source, the oscillation axis of the movable section, and the light receiving section and the maximum deflection angle is set to a predetermined ratio. On this occasion, since the light receiving section can receive the reflected light at the maximum deflection angle, it is possible to surely keep the detection accuracy of the maximum deflection angle.

Application Example 3

In the light scanning device according to the application example described above, it is preferable that the ratio $\theta_{max}/\theta_0$ exceeds 1, and is one of equal to and lower than 1.3.

According to this configuration, the ratio $\theta_{max}/\theta_0$ is greater than 1 and no greater than 1.3. When the ratio $\theta_{max}/\theta_0$ is lower than 1, the maximum deflection angle $\theta_{max}$ of the movable section is smaller than a half of the angle formed by the light source, the oscillation axis of the movable section, and the light receiving section, and therefore, the light receiving section fails to receive the reflected light. Further, when the ratio $\theta_{max}/\theta_0$ is equal to 1, the light receiving section can receive the light with the highest sensitivity. Further, when the ratio $\theta_{max}/\theta_0$ is higher than 1.3, the sensitivity in receiving light of the light receiving section is degraded. Therefore, when the ratio $\theta_{max}/\theta_0$ is in the range described above, the detection accuracy of the maximum deflection angle can surely be kept even if the maximum deflection angle of the movable section is changed.

Application Example 4

In the light scanning device according to the application example described above, it is preferable that the displacement driving section includes an electric motor, and a control section having a function of controlling an actuation of the electric motor, and the electric motor changes the position of the light source.

According to this configuration, the angle formed by the light source, the oscillation axis of the movable section, and the light receiving section can be determined due to the rotation of the electric motor. Further, by the control section controlling the actuation of the electric motor, the angle formed by the light source, the oscillation axis of the movable section, and the light receiving section is controlled. Therefore, it is possible to simplify the configuration of the displacement driving section.

Application Example 5

In the light scanning device according to the application example described above, it is preferable that there is further provided a support beam coupled to a drive shaft of the electric motor, and adapted to support the light source, and the drive shaft is disposed coaxially with the oscillation axis of the movable section.

According to this configuration, the support beam for supporting the light source is coupled to the drive shaft of the electric motor. Thus, it becomes possible to easily calculate the angle formed by the light source, the oscillation axis of the movable section, and the light receiving section based on the rotational angle of the drive shaft rotated by the electric motor. Therefore, the control when the displacement driving section displaces the light receiving section can easily be performed.

Application Example 6

In the light scanning device according to the application example described above, it is preferable that the displacement driving section makes a distance between the movable section and the light source constant.

According to this configuration, the light path length of the light emitted from the light source, then reflected by the light reflecting section of the movable section, and then reaching the light receiving section is kept constant. Therefore, the light receiving section can receive the reflected light with a stable light intensity.

Application Example 7

In the light scanning device according to the application example described above, it is preferable that the light receiving section is formed of a photodiode.

According to this configuration, the photodiode of the light receiving section flows the current with the intensity corresponding to the intensity of the light received. Then, it is possible to easily determine whether or not the light receiving section receives the light using the current.

Application Example 8

In the light scanning device according to the application example described above, it is preferable that the light source emits a laser beam.

According to this configuration, the light source emits the laser beam. The laser beam is the light having the optical characteristics superior in directionality, convergent property, high-intensity property, and so on. Therefore, it is possible to efficiently emit the laser beam toward the light reflecting section of the movable section.

Application Example 9

In the light scanning device according to the application example described above, it is preferable that the screen is irradiated with the light reflected by the light reflecting section, and the screen is scanned with the light in a predetermined direction.

According to this configuration, in the case of attempting to vary the size in a predetermined direction when irradiating the screen with the light, the change in size can surely be performed by making the magnitude of the maximum deflection angle variable.

Application Example 10

This application example is directed to an image forming device including the light scanning device described above, and the light reflecting section scans the light to form an image with the light.

According to this application example, the image forming device is provided with the light scanning device described above. Therefore, when changing the size of the image by changing the maximum deflection angle of the movable section, the maximum deflection angle can be detected with good accuracy. As a result, the image forming device equipped with the light scanning device capable of detecting the scanning width of the light with good quality can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
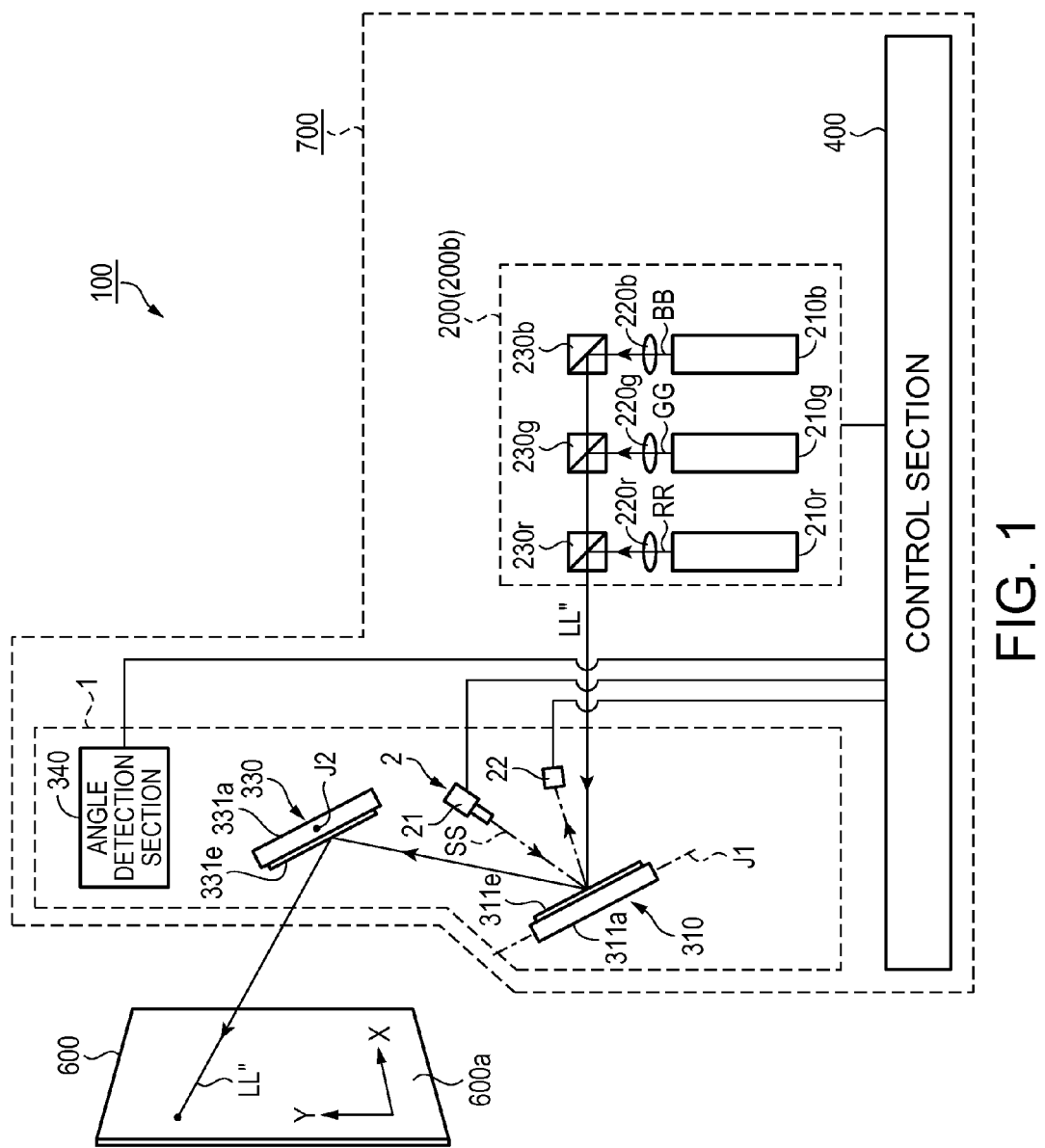
FIG. 1 is a schematic diagram for explaining a configuration of a projector provided to an image forming device according to a first embodiment of the invention.

Hereinafter, the light scanning device and the image forming device according to the invention will be explained in detail based on some exemplary embodiments shown in accompanying drawings. It should be noted that each of members in each of the drawings is illustrated with a different scale from each other in order for providing a size large enough to be recognized in the drawing.

First Embodiment

Figure 2:
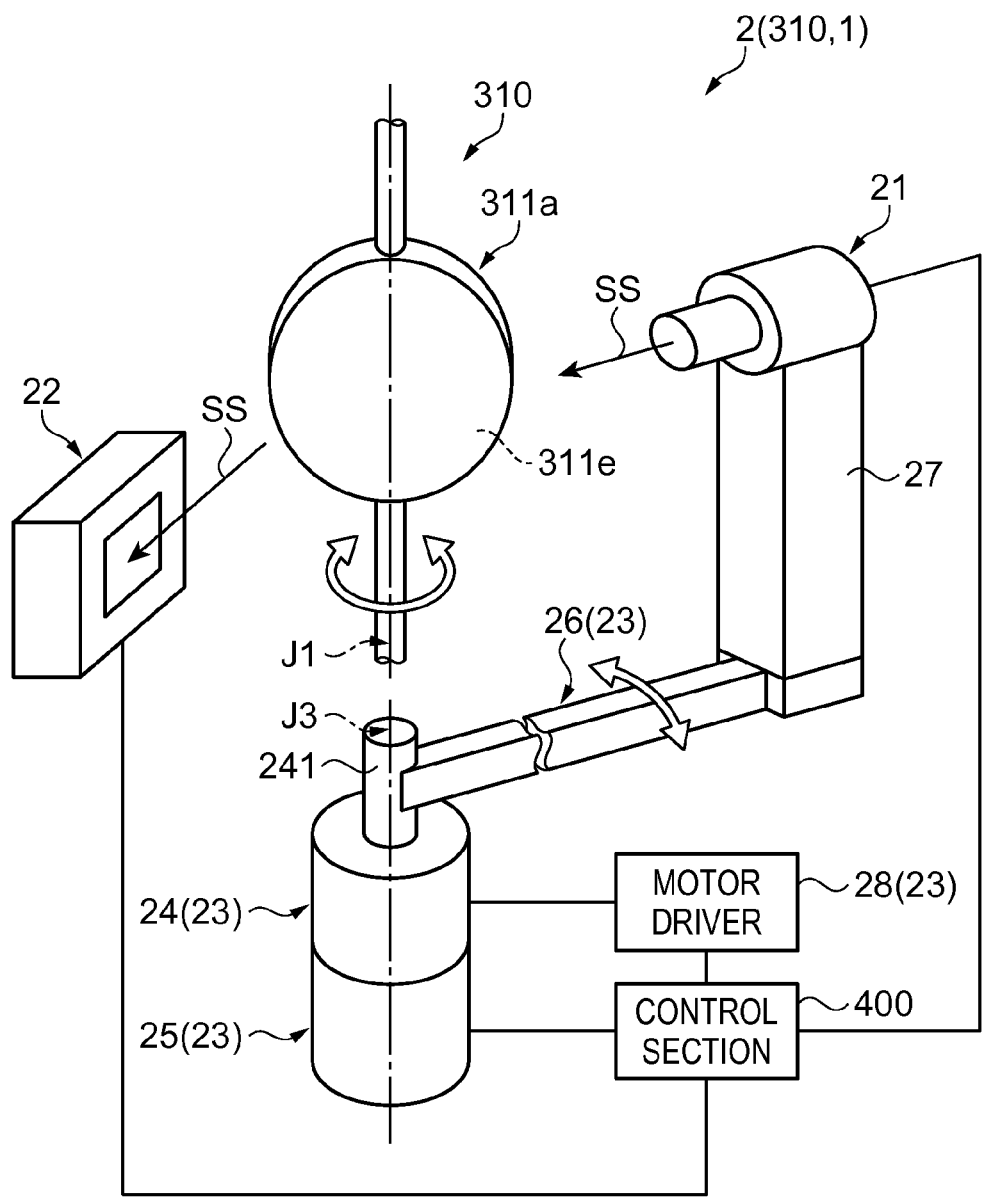
FIG. 2 is a schematic perspective view showing a light scanning device incorporated in the projector.
Figure 3:
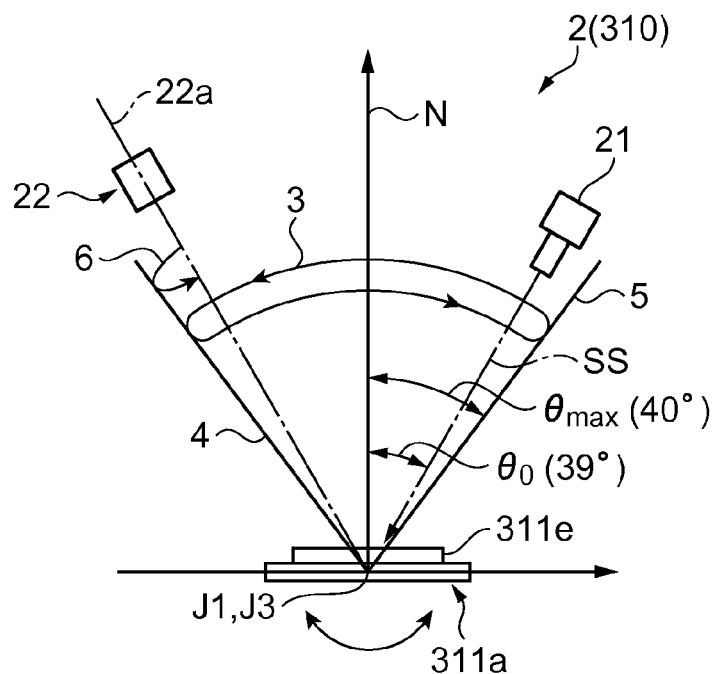
FIG. 3 is a schematic plan view for explaining an actuation state of the light scanning device.
Figure 4:
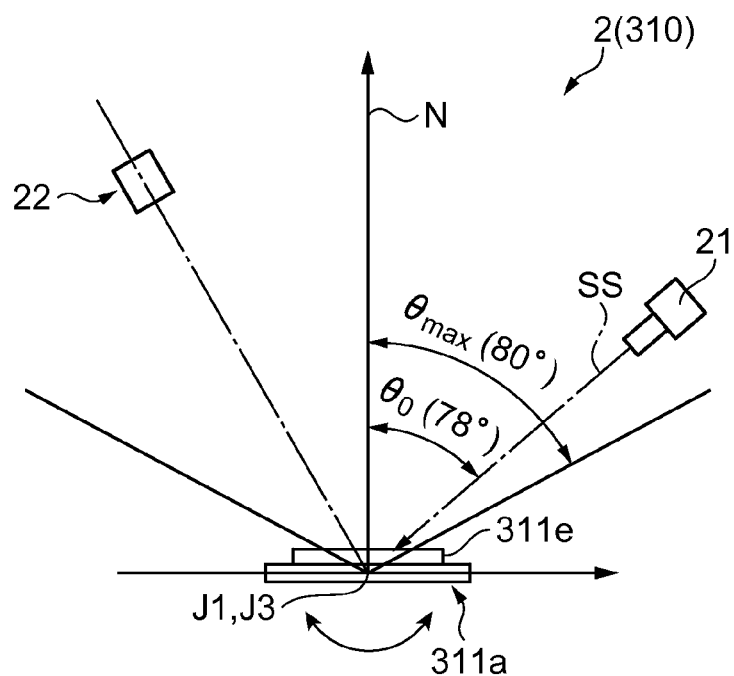
FIG. 4 is a schematic plan view for explaining an actuation state of the light scanning device.

FIG. 1 is a schematic diagram for explaining a configuration of a projector provided to an image forming device according to a first embodiment. FIG. 2 is a schematic perspective view showing a light scanning device incorporated in the projector. FIGS. 3 and 4 are schematic plan views for explaining the actuation state of the light scanning device. It should be noted that the upper side of FIG. 2 is referred to as "up" or "above," and the lower side is referred to as "down" or "below" for the sake of convenience of explanation.

As shown in FIG. 1, the image forming device 100 has a screen 600 as a display object located inside (indoor) of a building or outdoors, and a projector 700 for displaying a predetermined image such as a still image or a moving image on a display surface 600a formed on the front side of the screen 600.

The screen 600 is fixed to, for example, a wall of the building. The display surface 600a of the screen 600 has an impermeable property, and is an opaque white substance. Thus, the image can clearly be displayed with the display light LL" emitted from the projector 700.

Further, the projector 700 is disposed in the vicinity of the screen 600, and is configured to display the image on the screen 600 using proximity projection.

Further, the projector 700 is disposed in a place on the lower side of and close to the screen 600. Further, the projector 700 is disposed within 1 m from the region of the display surface 600a of the screen 600 closest to the projector 700. By disposing the projector 700 in the vicinity of the screen 600 as described above, it is possible to effectively prevent the display light LL" emitted from the projector 700 from being blocked by a barrier such as a pedestrian. Further, it is possible to more reliably display a desired image on the display surface 600a.

The projector 700 has a light source unit 200 (a light emitting section) for emitting the display light LL", a light scanning device 1 (a light scanning section) for reflecting the display light LL" emitted from the light source unit 200 to thereby scan the display surface 600a of the screen 600 with the display light LL", and a control section 400 for controlling the actuation of the light source unit 200 and the light scanning device 1. Further, the light source unit 200 has a display light source 200b for emitting the display light LL" for displaying the image on the display surface 600a.

The display light source 200b is provided with laser sources 210r, 210g, and 210b for respective colors of red, green, and blue, and collimator lenses 220r, 220g, and 220b and dichroic mirrors 230r, 230g, 230b disposed correspondingly to the laser sources 210r, 210g, and 210b of the respective colors. The laser sources 210r, 210g, and 210b of the respective colors emit laser beams RR, GG, and BB of red, green, and blue, respectively. The laser beams RR, GG, BB are respectively emitted in the condition of being modulated in accordance with a drive signal transmitted from the control section 400, and then collimated by the collimator lenses 220r, 220g, and 220b to be formed as fine beams.

The dichroic mirrors 230r, 230g, and 230b have properties of reflecting the red laser beam RR, the green laser beam GG, and the blue laser beam BB, respectively, and combine the laser beams RR, GG, and BB of the respective colors with each other to emit the unified display light LL" (the laser beam).

It should be noted that a collimator mirror can be used instead of the collimator lenses 220r, 220g, 220b, and also in this case, the fine collimated light beams can be formed. Further, in the case in which the collimated light beams are emitted from the laser sources 210r, 210g, and 210b of the respective colors, the collimator lenses 220r, 220g, and 220b can be eliminated. Further, the laser sources 210r, 210g, and 210b can be replaced with light sources such as light emitting diodes for generating similar light beams.

Further, the order of the laser sources 210r, 210g, and 210b, the collimator lenses 220r, 220g, and 220b, and the dichroic mirrors 230r, 230g, and 230b of the respective colors is nothing more than an example. The order thereof can freely be set while keeping the combinations for the respective colors (the laser source 210r, the collimator lens 220r, and the dichroic mirror 230r for red, the laser source 210g, the collimator lens 220g, and the dichroic mirror 230g for green, and the laser source 210b, the collimator lens 220b, and the dichroic mirror 230b for blue). For example, the combination of blue, red, and green in the order from a light scanner 310 is also possible.

The light scanning device 1 has a function of emitting the display light LL" emitted from the light source unit 200 to the screen 600 to thereby scan the display surface 600a with the display light LL". Such a light scanning device 1 has a light scanner 310 as a horizontal scanning mirror for scanning the display surface 600a in a horizontal direction (an x direction) with the display light LL" emitted from the light source unit 200. Further, the light scanning device 1 has a light scanner 330 as a vertical scanning mirror for scanning the display surface 600a in a vertical direction (a y direction) with the display light LL" emitted from the light source unit 200, and an angle detection section 340 for detecting the rotational angle (behavior) of a movable plate 331a provided to the light scanner 330.

The movable plate (movable section) 311a is formed of a plate-like body. Further, the movable plate 311a is provided with a light reflecting section 311e (a mirror) having a light-reflecting property disposed on one surface thereof. Further, the movable plate 311a rotates (oscillates) around a rotational center axis (an oscillation axis) J1 perpendicular to the thickness direction thereof due to the electromagnetic drive using a magnet coil (not shown) and a permanent magnet (not shown). By the rotation of the movable plate 311a, it is possible to scan the screen 600 with the display light LL" reflected by the light reflecting section 311e in the horizontal direction.

Further, by controlling the amplitude and the drive frequency of the voltage to be applied to the magnetic coil using the control section 400, it is possible to vary the magnitude of the maximum deflection angle (rotational angle) $\theta_{max}$ of the movable plate 311a. For example, in the case of attempting to vary the size (the projection size) in the horizontal direction of the image on the screen 600, the variation can surely be performed by making the magnitude of the maximum deflection angle $\theta_{max}$ variable. Here, the maximum deflection angle $\theta_{max}$ denotes the maximum angle of the movable plate 311a in the horizontal direction shown in FIGS. 3 and 4 with respect to the normal line N in the initial state in which the movable plate 311a has not yet been actuated.

Incidentally, if the deflection angle of the movable plate 311a of the light scanner 310 is constant, the displacement of the display light LL" in the light emitting state varies in accordance with the angle of the movable plate 331a of the light scanner 330, and increases as the position on the display surface 600a in the vertical direction scanned with the display light LL" gets away from the projector 700. Therefore, in the projector 700, by arranging that the further from the projector 700 the position on the display surface 600a in the vertical direction is, the smaller the deflection angle of the movable plate 311a is, the displacement of the display light LL" in the light emitting state is made constant along the vertical direction. By performing such a correction, so-called "keystone distortion" can be corrected.

The movable plate 331a is also formed of a plate-like body. Further, the movable plate 331a is provided with a light reflecting section 331e (a mirror) having a light-reflecting property disposed on one surface thereof. Further, the movable plate 331a is driven around a rotational center axis J2 having a perpendicular positional relationship with the rotational center axis J1 due to the electromagnetic drive using, for example, a magnetic coil (not shown) and a permanent magnet (not shown). By the rotation describe above, it is possible to scan the screen 600 with the display light LL" reflected by the light reflecting section 331e in a perpendicular direction (the vertical direction). Further, by the scanning in the vertical direction and the scanning in the horizontal direction, it is possible to form the image on the screen 600.

Further, the control of the magnitude of the maximum deflection angle $\theta_{max}$ of the movable plate 331a is performed by controlling the level of the voltage applied to the magnetic coil disposed so as to correspond to the movable plate 331a using the control section 400. The movable plate 311a (except the light reflecting section 311e) and the movable plate 331a (except the light reflecting section 331e) are each formed using, for example, silicon as a primary material. The light reflecting sections 311e, 331e are each formed of a metal thin film formed by, for example, vapor deposition.

The angle detection section 340 can be composed of, for example, a strain gauge for detecting the stress caused in the movable plate while the movable plate 331a is moving, a resistance variation detection section for detecting the resistance variation in the strain gauge in accordance with the stress variation of the movable plate, and an angle detection section for obtaining the angle of (detecting the behavior of) the corresponding movable plate based on the detection result of the resistance variation detection section.

The control section 400 is configured so as to control the actuation of the light source unit 200 and the light scanning device 1 so that the display light LL" is emitted based on the image data to be displayed on the display surface 600a of the screen 600 transmitted from a computer or the like not shown. Thus, it is possible to more reliably display the desired image on the display surface 600a.

Incidentally, as shown in FIGS. 1 and 2, the light scanning device 1 is further provided with a rotation detection section 2 as a detection section for detecting that the movable plate 311a of the light scanner 310 rotates with the maximum deflection angle $\theta_{max}$. In the light scanning device 1, it is possible to assure that the movable plate 311a rotates with the maximum deflection angle $\theta_{max}$ within a predetermined detection accuracy (the maximum deflection angle $\theta_{max} \pm 1$ degree) due to the activation of the rotation detection section 2.

As shown in FIG. 2, the rotation detection section 2 is composed of a light source 21 for emitting a laser beam SS toward the light reflecting section 311e of the movable plate 311a, a light receiving section 22 for receiving the reflected light, which is the laser beam SS from the light source 21 reflected by the light reflecting section 311e, and a displacement driving section 23 for changing the position of the light source 21 in accordance with the maximum deflection angle $\theta_{max}$ of the movable plate 311a. Further, the light source 21, the light receiving section 22, and the displacement driving section 23 are disposed outside the light path of the display light LL" from the light source unit 200, namely the position where these sections are prevented from blocking the display light LL", inside the light scanning device 1.

The light receiving section 22 is fixed to a housing (not shown) of, for example, the light scanning device 1. Further, the light source 21 is electrically connected to the control section 400. Thus, the control section 400 can perform the control of putting on and off the light source 21.

Such a light source 21 is arranged to be able to emit the laser beam SS. Since the laser beam SS is light having the optical characteristics superior in directionality, convergent property, high-intensity property, and so on, it is possible to reliably emit the laser beam SS toward the light reflecting section 311e of the movable plate 311a with efficiency. It should be noted that the device for emitting the laser beam SS is not particularly limited, but there can be cited, for example, a gas laser device such as a He—Ne laser, a solid-state laser device such as a Nd-YAG laser, and a semiconductor laser such as a GaAlAs laser as the device for emitting the laser beam SS.

The laser beam SS (the reflected light) reflected by the light reflecting section 311e of the movable plate 311a is received by the light receiving section 22. The light receiving section 22 is formed of a photodiode electrically connected to the control section 400. Thus, the light receiving section 22 is arranged to generate the electrical current with the intensity corresponding to the intensity of the laser beam SS received. Further, it is possible to make a determination on whether or not the light receiving section 22 receives the laser beam SS based on the magnitude relation between the level of the current and a predetermined determination value set previously compared with each other. It should be noted that the determination value is stored in the control section 400.

Incidentally, the case in which the light source is fixedly installed with respect to the rotational center axis J1 of the movable plate 311a, for example, will be explained. An installation angle of the light receiving section 22 is defined as the angle formed by the light source 21, the rotational center axis J1 of the movable plate 311a, and the light receiving section 22. In this case, if the maximum deflection angle $\theta_{max}$ is set to an angle far greater than a half of the installation angle of the light receiving section 22, the place irradiated with the laser beam SS goes beyond the light receiving section 22, and therefore, the detection accuracy (resolution) of the light receiving section 22 is degraded. The maximum deflection angle $\theta_{max}$ can be obtained using Formula I below.

$$t_2/t_1 = (1/\pi)*\arccos(\theta_0/\theta_{max}) \quad (1)$$

It should be noted that in FIG. 3 the course of the rotation of the normal line of the light reflecting section 311e of the movable plate 311a starting from the line connecting the rotational center axis J1 of the movable plate 311a and the light receiving section 22 and then returning to the line after a stroke is defined as a first course 3. The symbol $t_1$ denotes the time necessary for the normal line to lap the first course 3. In other words, the end of the range of the stroke of the normal line located on the light receiving section 22 side is defined as a first rotation limit 4, and the end thereof located on the light source 21 side is defined as a second rotation limit 5. Further, the normal line makes a stroke between the first rotation limit 4 and the second rotation limit 5. The time $t_1$ corresponds to the reciprocation time (cycle time) for the normal line of the movable plate 311a to make a stroke between the first rotation limit 4 and the second rotation limit 5.

A course of the normal line of the light reflecting section 311e moving from the line 22a connecting the rotational center axis J1 and the light receiving section 22 to the first rotation limit 4 and then returning to the line 22a from the first rotation limit 4 is defined as a second course 6. The symbol $t_2$ denotes the time necessary for the normal line to move along the second course 6.

In the case in which, for example, the maximum deflection angle $\theta_{max}$ is 40 degrees, and the light source 21 is disposed at the position where the reaction to the maximum deflection angel $\theta_{max}$ with the highest sensitivity is obtained, if the maximum deflection angle $\theta_{max}$ is changed to 80 degrees, the second course 6 is elongated. Therefore, the detection accuracy (sensitivity) of the light receiving section 22 is degraded. As described above, in the case in which the light source 21 is fixedly installed, the difference in the detection accuracy of the light receiving section 22 occurs. Therefore, it is unachievable to assure that the movable plate 311a is rotating with the maximum deflection angle $\theta_{max}$.

Therefore, the light scanning device 1 is configured to prevent such a problem. Specifically, when the maximum deflection angle $\theta_{max}$ varies, the light scanning device 1 moves the position of the light source in conjunction with the variation of the maximum deflection angle $\theta_{max}$. Specifically, the light scanning device 1 is configured to rotate the light source 21 around a rotational center axis J3 as much as a following angle $\theta_0$ (rotational angle) (see FIGS. 3 and 4). It should be noted that the rotational axis J3 on which the light source 21 is rotated is disposed coaxially with the rotational center axis J1 of the movable plate 311a. As a mechanism of moving the position of the light source 21, there is disposed the displacement driving section 23. It should be noted that the following angle $\theta_0$ is also an angle corresponding to a half of the angle formed by the light source 21, the rotational center axis J1 of the movable plate 311a, and the light receiving section 22.

Further, as shown in FIG. 2, the displacement driving section 23 provided to the rotation detection section 2 is composed of an electric motor 24, a motor driver 28, a control section 400, an encoder 25, a support beam 26, and so on. Thus, the displacement driving section 23 can be composed of a small number of units, and therefore, it is possible to make the configuration of the displacement driving section 23 relatively simple.

The electric motor 24 is, for example, a servomotor having a shaft 241 as a drive shaft. The electric motor 24 is electrically connected to the control section 400 via the motor driver 28. The command related to the rotational conditions (the following angle $\theta_0$, the rotational speed, and so on) of the shaft 241 from the control section 400 is transmitted to the motor driver 28. The motor driver 28 controls the actuation of the motor 24 in accordance with the command.

Further, the encoder 25 is capable of detecting the following angle $\theta_0$ of the shaft 241 and so on. By feeding back the detection result to the control section 400, the actuation of the electric motor 24 can be controlled with accuracy.

As shown in FIGS. 2 through 4, the electric motor 24 is disposed so that the rotational center axis J3 of the shaft 241 is located coaxially with the rotational center axis J1 of the movable plate 311a. Thus, the control section 400 can easily perform the control of "keeping the ratio $\theta_{max}/\theta_0$ in a predetermined value" as described later.

The support beam 26 having an elongated shape is connected to the shaft 241 of the electric motor 24. The support beam 26 extends in a direction perpendicular to the shaft 241. The support beam 26 supports the light source 21 via a spacer 27 at the end of the support beam 26. Thus, when the shaft 241 rotates around the rotational center axis J3, it is also possible for the light source 21 to rotate around the rotational center axis J3.

The constituent material of the support beam 26 is not particularly limited providing the material has sufficient rigidity, and a variety of metal materials such as aluminum or stainless steel, and a variety of resin materials such as polypropylene can be used as the constituent material of the support beam 26. Further, by forming the support beam 26 with the relatively toughened material as described above, it is possible for the support beam 26 to keep the distance between the light source 21 and the movable plate 311a (the rotational center axis J1) in a predetermined distance. Thus, the light path length of the laser SS emitted from the light source 21, then reflected by the light reflecting section 311e of the movable plate 311a, and then reaching the light receiving section 22 can be kept in the predetermined distance irrespective of the magnitude of the following angle $\theta_0$. Therefore, the intensity of the laser beam SS received in the light receiving section 22 becomes also constant, and thus, the stable light reception becomes possible.

Then, the control (the actuation of the light scanning device 1) of the control section 400 when confirming that the movable plate 311a is rotating with the maximum deflection angle $\theta_{max}$ even in the case in which the maximum deflection angle $\theta_{max}$ varies will be explained with reference to FIGS. 3 and 4. Hereinafter, the state shown in FIG. 3 is referred to as a "first state," and the state shown in FIG. 4 is referred to as a "second state."

In the control section 400, the control is performed so that the ratio $\theta_{max}/\theta_0$ between the maximum deflection angle ratio $\theta_{max}$ and the following angle $\theta_0$ is kept in a predetermined ratio. The ratio $\theta_{max}/\theta_0$ is not particularly limited, and is preferably a value in a range, for example, greater than 1 and no greater than 1.3. When the ratio $\theta_{max}/\theta_0$ is lower than 1, the light receiving section 22 fails to detect the laser beam SS. Further, if the ratio $\theta_{max}/\theta_0$ exceeds 1.3, the sensitivity of the rotation detection section 2 is degraded. Further, the ratio $\theta_{max}/\theta_0$ is more preferably a value in a range no smaller than 1.01 and no greater than 1.25. Further, it is also possible to improve the sensitivity of the rotation detection section 2. It should be noted that the value of the ratio $\theta_{max}/\theta_0$ is previously stored in the control section 400, and is assumed to be set to, for example, 1.03 in the following explanation.

In the first state shown in FIG. 3, it is assumed that the movable plate 311a is rotating with the maximum deflection angle $\theta_{max}$ of, for example, 40 degrees. On this occasion, since it is only required to fulfill the ratio $\theta_{max}/\theta_0=1.03$, it is sufficient to dispose the light source 21 in the position where the following angle $\theta_0$ is 39 degrees.

Further, it is assumed that the first state shown in FIG. 3 is changed to the second state shown in FIG. 4 by, for example, changing the maximum deflection angle $\theta_{max}$ from 40 degrees to 80 degrees. Also on this occasion, since it is only required to fulfill the ratio $\theta_{max}/\theta_0=1.03$, it is sufficient to dispose the light source 21 in the position where the following angle $\theta_0$ is 78 degrees.

According to the control described above, even if the maximum deflection angle $\theta_{max}$ is significantly varied, it is possible to surely keep the detection accuracy of the maximum deflection angle $\theta_{max}$ in the light receiving section 22. Thus, it is possible to detect the fact that the movable plate 311a is rotating with the maximum deflection angle $\theta_{max}$ to thereby assure the fact.

As described above, according to the present embodiment, there are obtained the following advantages.

(1) According to the present embodiment, the rotation detection section 2 has the light source 21, the light receiving section 22, and the displacement driving section 23. Further, the light source 21 emits the light to the light reflecting section 311e, and the light receiving section 22 receives the reflected light reflected by the light reflecting section 311e. The rotation detection section 2 detects whether or not the movable plate 311a is rotating with the maximum deflection angle $\theta_{max}$ based on whether or not the light receiving section 22 receives the reflected light. When changing the magnitude of the maximum deflection angle $\theta_{max}$ of the rotation, the displacement driving section 23 changes the position of the light source 21. Therefore, the position of the light source 21 can be changed even when changing the maximum deflection angle $\theta_{max}$ of the movable plate 311a. Therefore, the detection accuracy of the maximum deflection angle $\theta_{max}$ can be kept even when changing the maximum deflection angle $\theta_{max}$ of the movable plate 311a.

(2) According to the present embodiment, even when changing the maximum deflection angle $\theta_{max}$ of the movable plate 311a, the displacement driving section 23 changes the position of the light source 21. Further, the ratio between a half of the angle formed by the light source 21, the rotational center axis J1 of the movable plate 311a, and the light receiving section 22 and the maximum deflection angle is set to a predetermined ratio. On this occasion, since the light receiving section 22 can receive the reflected light at the maximum deflection angle $\theta_{max}$, it is possible to surely keep the detection accuracy of the maximum deflection angle $\theta_{max}$.

(3) According to the present embodiment, the ratio $\theta_{max}/\theta_0$ is greater than 1 and no greater than 1.3. When the ratio $\theta_{max}/\theta_0$ is lower than 1, the maximum deflection angle $\theta_{max}$ is smaller than a half of the angle formed by the light source 21, the rotational center axis of the movable plate 311a, and the light receiving section 22, and therefore, the light receiving section 22 fails to receive the reflected light. Further, when the ratio $\theta_{max/\theta 0}$ is equal to 1, the light receiving section 22 can receive the light with the highest sensitivity. Further, when the ratio $\theta_{max}/\theta_0$ is higher than 1.3, the sensitivity in receiving light of the light receiving section 22 is degraded. Therefore, when the ratio $\theta_{max}/\theta_0$ is in the range described above, the detection accuracy of the maximum deflection angle $\theta_{max}$ can surely be kept even if the maximum deflection angle $\theta_{max}$ of the movable plate 311a is changed.

(4) According to the present embodiment, the angle formed by the light source 21, the rotational center axis J1 of the movable plate 311a, and the light receiving section 22 can be determined by the rotation of the electric motor 24. Further, the control section 400 controls the angle formed by the light source 21, the rotational center axis J1 of the movable plate 311a, and the light receiving section 22 by controlling the actuation of the electric motor 24. Therefore, it is possible to simplify the configuration of the displacement driving section 23.

(5) According to the present embodiment, the support beam 26 for supporting the light source 21 is coupled to the shaft 241 as the drive shaft of the electric motor 24. Thus, it becomes possible to easily calculate the angle formed by the light source 21, the rotational center axis J1 of the movable plate 311a, and the light receiving section 22 based on the rotational angle of the shaft 241 rotated by the electric motor 24. Therefore, the control when the displacement driving section 23 displaces the light source 21 can easily be performed.

(6) According to the present embodiment, the light path length of the light emitted from the light source 21, then reflected by the light reflecting section 311e of the movable plate 311a, and then reaching the light receiving section 22 can be kept in the predetermined distance. Therefore, the light receiving section 22 can receive the reflected light with a stable light intensity.

(7) According to the present embodiment, the photodiode of the light receiving section 22 flows the current with the intensity corresponding to the intensity of the light received. Then, it is possible to easily determine whether or not the light receiving section 22 receives the light using the current.

(8) According to the present embodiment, the light source 21 emits the laser beam. The laser beam is the light having the optical characteristics superior in directionality, convergent property, high-intensity property, and so on. Therefore, it is possible to efficiently emit the laser beam toward the light reflecting section 311e of the movable plate 311a.

(9) According to the present embodiment, in the case of attempting to vary the size in a predetermined direction when irradiating the screen 600 with the light, the change in size can surely be performed by making the magnitude of the maximum deflection angle $\theta_{max}$ variable.

(10) According to the present embodiment, the image forming device 100 is provided with the light scanning device 1 described above. Therefore, when changing the size of the image by changing the maximum deflection angle $\theta_{max}$ of the movable plate 311a, the maximum deflection angle $\theta_{max}$ can be detected with good accuracy. As a result, the image forming device 100 equipped with the light scanning device 1 capable of detecting the scanning width of the light with good quality can be obtained.

Second Embodiment

Then, a projector as an embodiment of the invention will be explained with reference to FIGS. 5 through 10.

Figure 5:
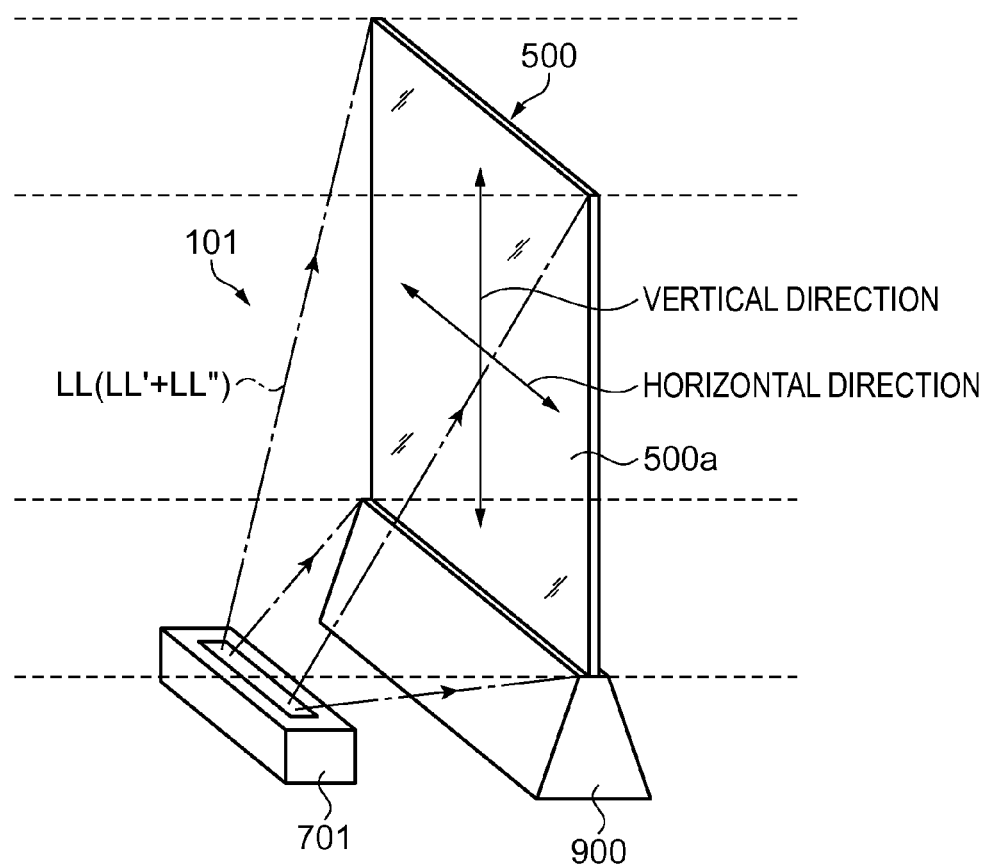
FIG. 5 is a schematic perspective view showing a structure of an image forming device according to a second embodiment of the invention.
Figure 6:
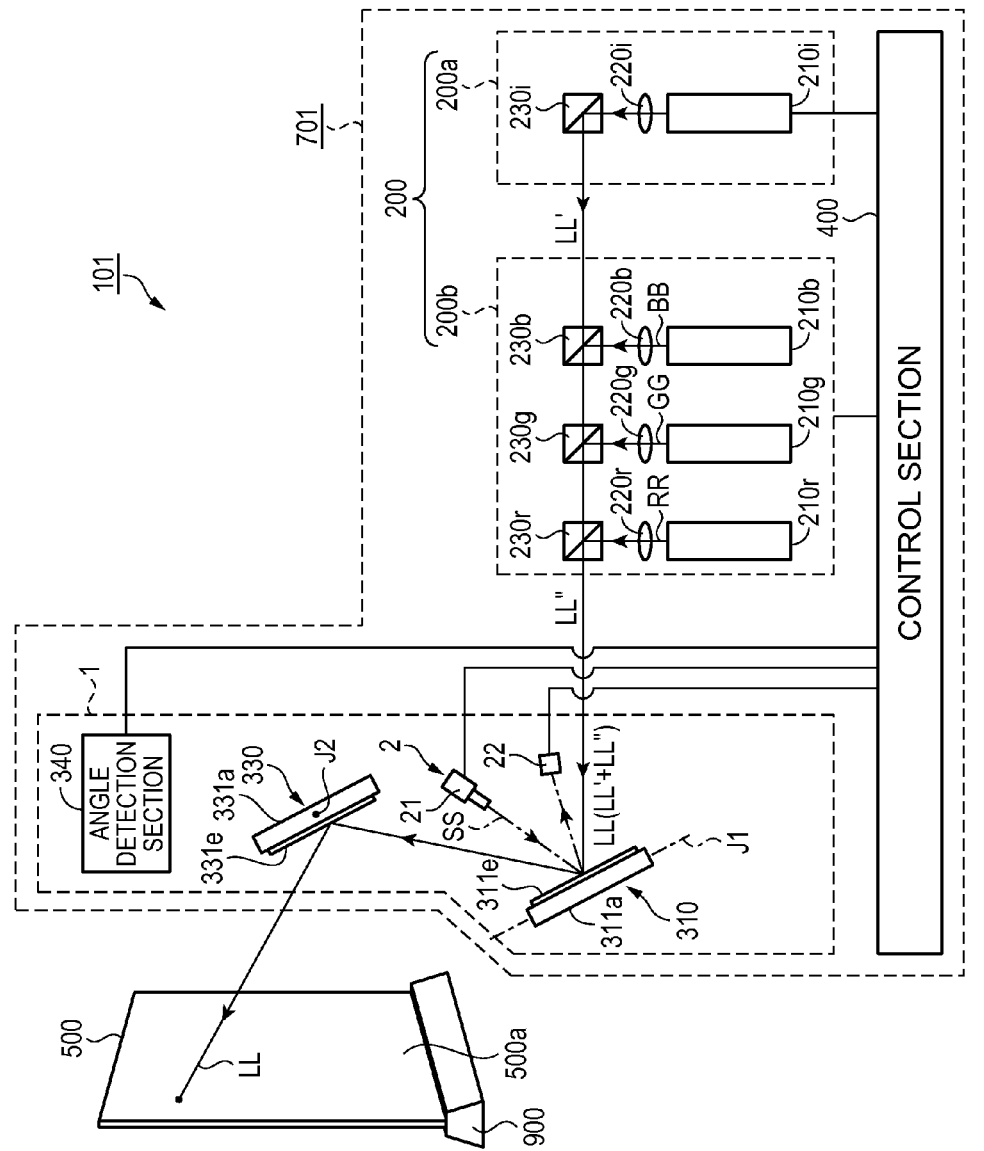
FIG. 6 is a schematic diagram for explaining a configuration of a projector provided to the image forming device.
Figure 7:
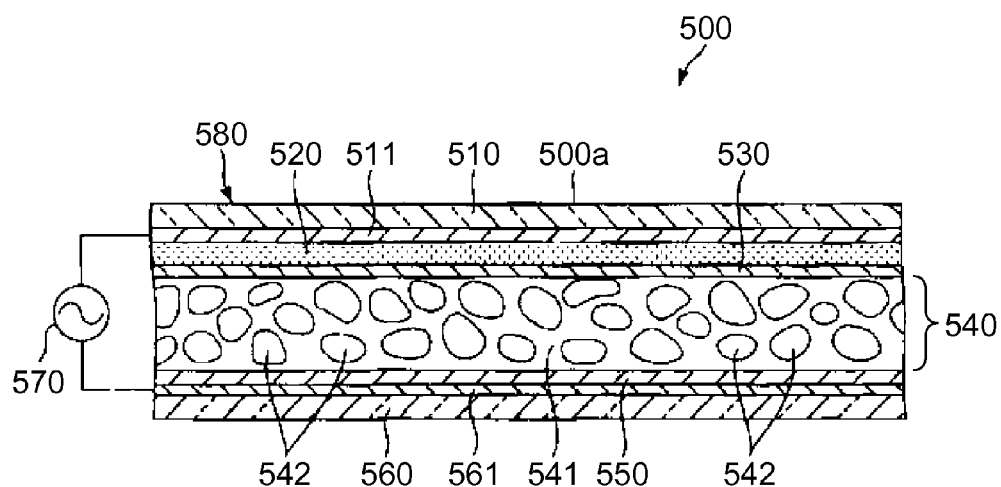
FIG. 7 is a schematic cross-sectional view showing a structure of a screen provided to the image forming device.
Figure 8:
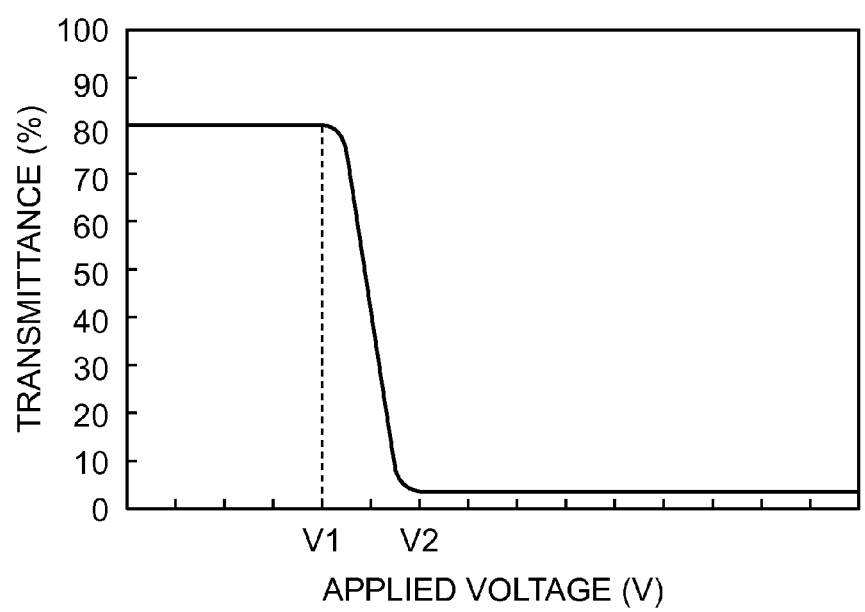
FIG. 8 is a graph showing a relationship between the transmittance of the screen and the level of the voltage applied to a liquid crystal polymer composite layer.
Figure 9:
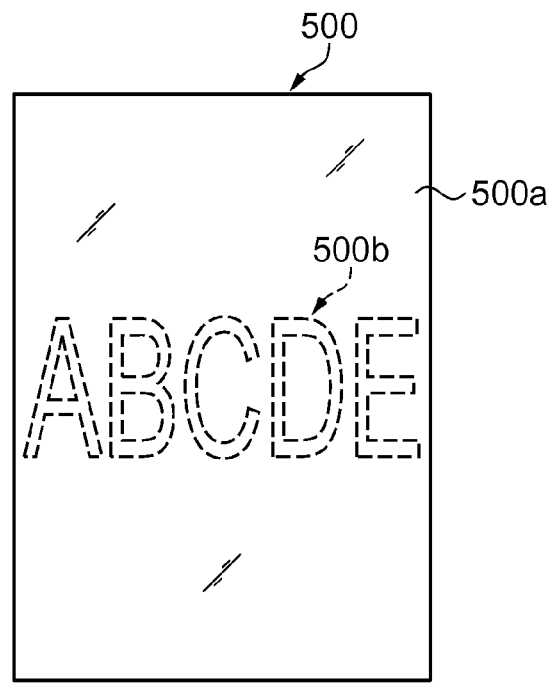
FIG. 9 is a schematic plan view for explaining an actuation state of the screen.
Figure 10:
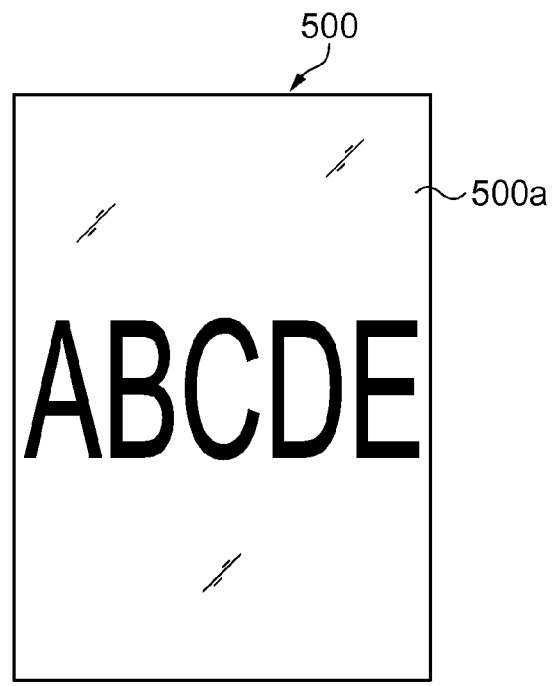
FIG. 10 is a schematic plan view for explaining an actuation state of the screen.

FIG. 5 is a schematic perspective view showing a structure of an image forming device according to a second embodiment. FIG. 6 is a schematic diagram for explaining a configuration of the projector provided to the image forming device. FIG. 7 is a schematic cross-sectional view showing a structure of a screen provided to the image forming device. FIG. 8 is a graph showing a relationship between the transmittance of the screen and the level of the voltage applied to a liquid crystal polymer composite layer. FIGS. 9 and 10 are schematic plan views for explaining the actuation state of the screen. It should be noted that the upper side of FIGS. 5, 9, and 10 is referred to as "up" or "above," and the lower side is referred to as "down" or "below" for the sake of convenience of explanation. Further, the upper side of FIG. 7 is referred to as "front (front side)" or "forward," and the lower side is referred to as "rear (back side)" or "backward."

Hereinafter, the light scanning device and the image forming device as the second embodiment of the invention will be described with reference to these drawings with a focus mainly on the differences from the embodiment described above, and the explanations regarding similar matters will be omitted.

The present embodiment is the same as the first embodiment except that the configurations of the screen and the projector are respectively different therefrom.

As shown in FIG. 5, the screen 500 is supported upright by a stage 900, and is installed without being fixed to a wall of a building or propped up. Further, in the image forming device 101 according to the present embodiment, as shown in FIG. 6, it is arranged that the light source unit 200 of the projector 701 further includes an address light source 200a.

The screen 500 is colorless and transparent (in a light transmissive state) when displaying no image, and is arranged to allow visual recognition of things behind the screen 500 as if the screen 500 were a transparent glass plate. Then, when displaying the image on the screen 500 using the projector 701, only the area of the display surface 500a where the image is displayed is set to a cloudy state (a light diffusion state), and the laser beam LL is emitted from the projector 701 to the area in the cloudy state to thereby display the desired image on the screen 500. On this occasion, the area where no image is displayed is kept in the light transmissive state (the transparent state). Therefore, according to the image forming device 101 having such a configuration, first, there is an advantage that the screen 500 does not hinder the sight when the screen 500 is not in use (displays no image). Second, since the image is displayed on the transparent plate when the screen 500 is in use (displays the image), it is possible to provide the observer with the feeling like the image stands out, and to effectively make the observer have an interest in and respect to the image displayed. In other words, according to the image forming device 101, it is possible to exert superior advertisement effect.

As described above, the image forming device 101 has the screen 500 and the projector 701. Hereinafter, configurations of the respective constituents will be explained.

Firstly, the screen 500 will be explained. As shown in FIG. 7, the screen 500 has a screen main body 580 configured by stacking a first substrate 510 provided with a first electrode 511, a photoconductive film 520, an oriented film 530, a liquid crystal polymer composite layer 540 (a liquid crystal layer), an oriented film 550, and a second substrate 560 provided with a second electrode 561 in this order from the display surface 500a side, and a voltage applying section 570 for applying a voltage between the first electrode 511 and the second electrode 561. By adopting such a configuration as described above, the screen 500 capable of switching between the light transmissive state and the light diffusion state described above can easily be obtained.

The first substrate 510 and the second substrate 560 are each formed of a sheet-like (plate-like) member, and have a function of supporting and protecting the members disposed therebetween. Further, the first substrate 510 and the second substrate 560 each have a light transmissive property, and are substantially colorless and transparent. The first substrate 510 and the second substrate 560 each can have elasticity or can be toughened.

The constituent materials of the first substrate 510 and the second substrate 560 are each not particularly limited, and glass, silicon, and a polymer film made of, for example, polyester (polyethylene terephthalate), polysulphone, polyether sulphone, or polycarbonate can be used for the constituent materials.

On the rear surface (the surface on the liquid crystal polymer composite layer 540 side) of the first substrate 510, there is formed the first electrode 511 having a film-like shape, and on the front surface (the surface on the liquid crystal polymer composite layer 540 side) of the second substrate 560, there is formed the second electrode 561 having a film-like shape. The first electrode 511 and the second electrode 561 each have a light transmissive property, and are substantially colorless and transparent. The first electrode 511 and the second electrode 561 are electrically connected to the voltage applying section 570, respectively, and when applying the voltage between the first electrode 511 and the second electrode 561 using the voltage applying section 570, an electrical field is caused between the first electrode 511 and the second electrode 561, and the electrical field thus caused is exerted on the photoconductive film 520 and the liquid crystal polymer composite layer 540.

As the constituent materials of the first electrode 511 and the second electrode 561 are each not particularly limited providing the constituent materials substantially have conductivity and are substantially colorless and transparent. As the constituent material, there can be cited a variety of types of conductive materials including metal materials such as gold, silver, copper, aluminum, or alloys including any of these metals, carbon-based materials such as carbon black, electronically conductive polymeric materials such as polyacetylene, polyfluorene, or derivatives of these materials, ionic conductive polymeric materials obtained by dispersing ionic materials such as NaCl, or $Cu(CF_3SO_3)_2$ in matrix resin such as polyvinyl alcohol or polycarbonate, and conductive oxides such as indium oxide (IO), indium tin oxide (ITO), or fluorine-doped tin oxide (FTO). Further, the above constituent materials can be used alone or in combination.

The photoconductive film 520 has a film-like shape, and is formed on the rear surface (the surface on the liquid crystal polymer composite layer 540 side) of the first electrode 511. Further, the photoconductive film 520 has a light transmissive property, and is substantially colorless and transparent. Such a photoconductive film 520 is only required to be varied in impedance in accordance with the intensity of the light with which the photoconductive film 520 is irradiated. As the photoconductive film 520, there can be used those obtained by depositing charge-generating material using a vapor deposition method, a sputtering method, an ion plating method, a CVD method, and so on, and those obtained by dispersing the charge-generating material into the resin binder and then applying it using a bar-coating method, a spin-coating method, a roll-coating method, a dipping method, a casting method, and so on. Alternatively, as the photoconductive film 520, those obtained by stacking a charge transfer layer on such a charge-generating layer, for example, can be used.

The charge-generating material is not particularly limited, and there can be used inorganic materials such as a-Si, ZnS, ZnO, CdS, CdSe, Se, SeTe, or TiO, and organic materials such as phthalocyanine series, azo series, polycyclic quinone series, indigo series, quinacridone series, perylene series, squarylium series, azulenium series, cyanine series, or pyrylium series.

Further, the resin binder is not particularly limited, and there can be used, for example, polycarbonate, polyarylate, polyethylene, polypropylene, polyester, polyvinyl acetate, polyvinyl butyral, acrylic, methacryl, vinyl chloride, vinyl acetate, and copolymers of these materials. As the charge transport material, there can be used organic materials such as carbazole series, triazole series, oxadiazole series, imidazole series, pyrazoline series, hydrazone series, stilbene series, amine series, or nitrofluorenone series.

The liquid crystal polymer composite layer 540 is in the phase-separating state in which the particles of the polymer 542 are dispersed in the liquid crystal 541.

As the polymer 542, there are used those compatible with the liquid crystal 541 in the state of the liquid crystal phase, and then phase-separated from the liquid crystal 541 when curing. As such a polymer 542, those obtained by attaching, for example, a benzene skeleton or a biphenyl backbone to the polymer main chain can widely be used without regard to the difference between thermoplastic polymers, thermosetting polymers, and ultraviolet curable polymers.

On the other hand, as the liquid crystal 541, those having positive dielectric anisotropy oriented in a direction parallel to the electrical field direction are used. As such a liquid crystal 541, there can be used, for example, phenylcyclohexane derivative liquid crystal, biphenyl derivative liquid crystal, biphenylcyclohexane derivative liquid crystal, terphenyl derivative liquid crystal, phenyl ether derivative liquid crystal, phenyl ester derivative liquid crystal, bicyclohexane derivative liquid crystal, azomethine derivative liquid crystal, asoxy derivative liquid crystal, pyrimidine derivative liquid crystal, dioxane derivative liquid crystal, and cubane derivative liquid crystal. Further, as the liquid crystal 541, one having a high refractive index anisotropy Δn as much as possible is preferably used in order for improving the contrast of the screen 500.

On the oriented films 530, 550, the orientation process for orienting the liquid crystal 541 and the polymer 542 of the liquid crystal polymer composite layer 540 in a direction parallel to the first substrate 510 and the second substrate 560 is performed. Although the polymer 542 is in the liquid crystal phase when oriented, the polymer 542 cures thereafter, and is therefore fixed while keeping the orientation state. Therefore, the polymer 542 has no chance of having the orientation direction aligned in the electrical field direction even if the electrical field is thereafter applied. In contrast, since the liquid crystal 541 is not fixed in the orientation state, it results that the orientation direction is aligned in the electrical field direction when applying the electrical field.

Therefore, in the case (the case in which the intensity of the electrical field fails to reach, for example, V1 as described later) in which no electrical field is applied to the liquid crystal polymer composite layer 540, the orientation directions of the polymer 542 and the liquid crystal 541 are in the state (the state in which the liquid crystal 541 and the polymer 542 are oriented in an aligned manner) of coinciding with each other in the parallel direction with respect to the first substrate 510 and the second substrate 560. By matching the refractive indexes of the both parties in this state, the screen 500 becomes in the transparent state (the light transmissive state).

On the contrary, if an electrical field is applied to the liquid crystal polymer composite layer 540, since the orientation direction of the liquid crystal 541 is aligned in the electrical field direction (since the liquid crystal 541 and the polymer 542 are in the state of being oriented in different directions), the light diffusion state is created due to the inconsistency in the refractive index at the interface between the liquid crystal 541 and the polymer 542 in the electrical field direction, and the screen 500 becomes in the cloudy state (the light diffusion state).

According to the liquid crystal polymer composite layer 540, since the colorless and transparent light transmissive state is created when applying no voltage, and the cloudy light diffusion state can be created by applying a voltage, the screen 500 suitable for the purpose of the image forming device 101 can be obtained. It should be noted that the switching between the light transmissive state and the light diffusion state can independently be performed in each of the regions of the display surface 500a.

The switching between the light transmissive state and the light diffusion state will be explained in detail.

The polymer 542 and the liquid crystal 541 show similar refractive index anisotropy, and have the refractive index of about 1.5 in the direction parallel to the orientation direction, and the refractive index of about 1.7 in the direction perpendicular to the orientation direction. In the state in which no electrical field is applied to the liquid crystal polymer composite layer 540, the liquid crystal 541 is oriented in the same direction as that of the polymer 542, and therefore, the refractive indexes of the liquid crystal 541 and the polymer 542 in the direction perpendicular to the first substrate 510 and the second substrate 560 are equal to each other. Therefore, in this state, the screen 500 becomes in the substantially colorless and transparent state (the light transmissive state) with the transmittance of about 80%.

In contrast, when the voltage is applied between the first electrode 511 and the second electrode 561 using the voltage applying section 570 to thereby act the electrical field on the liquid crystal polymer composite layer 540, while the orientation direction of the polymer 542 is kept as it is, only the liquid crystal 541 is oriented in the electrical field direction, namely the direction perpendicular to the first substrate 510 and the second substrate 560. Therefore, in the electrical field direction perpendicular to the first substrate 510 and the second substrate 560, the refractive index of the liquid crystal 541 is changed to about 1.5 while the refractive index of the polymer 542 is kept in about 1.7. Therefore, the difference in the refractive index in the electrical field direction between the polymer 542 and the liquid crystal 541 becomes about 0.2, and it results that the light entering in the direction perpendicular to the first substrate 510 and the second substrate 560 is diffused. As a result, in this state, the screen 500 becomes in the cloudy state (the light diffusion state) in the electrical field direction.

Then the relationship between the transmittance of the screen 500 and the level of the voltage applied to the liquid crystal polymer composite layer 540 will be explained with reference to FIG. 8. As shown in FIG. 8, the screen 500 keeps the transmittance as high as about 80% to thereby keep the substantially colorless and transparent state until the level of the voltage applied to the liquid crystal polymer composite layer 540 exceeds V1. Then, the transmittance drops rapidly in the period from when the level of the voltage exceeds V1 to when the level of the voltage reaches V2, and then becomes almost zero when the level of the voltage exceeds V2. As described above, it is understood that in the screen 500 the transmittance does not drop in a linear manner with respect to the level of the voltage applied to the liquid crystal polymer composite layer 540, but drops rapidly when the level of the voltage exceeds a predetermined voltage V1.

The usage of the screen 500 having the configuration described above will be explained.

Firstly, a voltage (alternating voltage) is applied between the first electrode 511 and the second electrode 561 using the voltage applying section 570 (hereinafter this state is also referred to as a "standby state"). The level of the voltage to be applied is preferably set to the level with which the voltage to be actually applied to the liquid crystal polymer composite layer 540 has the level slightly lower than or equal to V1. Thus, the screen 500 can be kept substantially colorless and transparent in the standby state, and at the same time, can be changed to the light diffusion state by slightly increasing the voltage from the standby state. It should be noted that although in the present embodiment the level of the voltage applied between the first electrode 511 and the second electrode 561 is determined so that the transmittance of the screen 500 in the standby state becomes about 80%, the transmittance of the screen 500 in the standby state is not particularly limited, and can also be set to, for example, about 70%. The level of the voltage can arbitrarily be set in accordance with the transmittance required in the standby state of the screen 500.

Subsequently, a desired region (a micro area) of the display surface 500a of the screen 500 in the standby state is irradiated with address light LL' from the projector 701. Then, in the region irradiated with the address light LL', the electrical resistance of the photoconductive film 520 drops due to the irradiation with the address light LL', and the actual voltage applied to the liquid crystal polymer composite layer 540 rises. Thus, the transmittance of this region drops, and the region becomes cloudy to be changed to the light diffusion state. On the other hand, regarding the region not irradiated with the address light LL', the light transmissive state is kept since the level of the voltage applied to the liquid crystal polymer composite layer 540 does not change. Then, by forming the regions in the light diffusion state in accordance with the image to be displayed on the display surface 500a, namely in the area where the image is displayed, the light diffusion area 500b (the area actually functioning as the screen) along the contour of the image is formed in the display surface 500a as shown in, for example, FIG. 9.

The light intensity of the address light LL' with which the display surface 500a is irradiated is not particularly limited providing the transmittance of the region irradiated with the address light LL' can be reduced, but is preferably the light intensity with which the transmittance of the screen 500 becomes no higher than 20%, and is further preferably the light intensity with which the transmittance becomes no higher than 5%. Thus, the light diffusion area 500b having a superior light diffusion property can be formed.

As described above, the screen 500 is used so as to be colorless and transparent in the standby state, and to be set to the light diffusion state only in the area where the image is displayed. Thus, the superior advertisement effect described above can be exerted.

Then, the projector 701 will be explained.

As shown in FIG. 6, in the present embodiment, the projector 701 has a light source unit 200 for emitting the laser beam LL. The light source unit 200 has an address light source 200a for emitting the address light LL' for setting the area of the display surface 500a corresponding to a desired image to the light diffusion state so that the image can be displayed on the display surface 500a in addition to the display light source 200b.

Such a projector 701 as described above is configured to scan the display surface 500a with the address light LL' and at the same time scan the area changed to the light diffusion state due to the irradiation with the address light LL' with the display light LL" to thereby display (form) the desired image on the display surface 500a. Thus, since the process (see FIG. 9) of forming the light diffusion area 500b on the display surface 500a and the process (see FIG. 10) of forming the image in the light diffusion area 500b can be performed at roughly the same time by the single projector 701, the device configuration of the image forming device 101 can be simplified, and at the same time the efficiency of the image display can be improved.

The address light source 200a is provided with a laser source 210i for emitting an infrared laser as the address light LL', and a collimator lens 220i and a dichroic mirror 230i disposed in accordance with the laser source 210i. The address light LL' emitted from the laser source 210i is collimated by the collimator lens 220i to be a fine beam, and is then reflected by the dichroic mirror 230i. Then, the address light LL' thus reflected is combined (overlapped) with the display light LL", and is then emitted from the light source unit 200 as the laser beam LL.

By using the infrared laser as the address light LL' as described above, it is possible to prevent the address light LL' from being visually recognized by the observer, and at the same time, to prevent the address light LL' from affecting the color of the image displayed on the display surface 500a, and thus, the desired image can be displayed on the display surface 500a.

It should be noted that in the address light source 200a, a collimator mirror can be used instead of the collimator lens 220i, and also in this case, the fine collimated light beam can be formed. Further, in the case in which the collimated light beam is emitted from the laser source 210i, the collimator lens 220i can be eliminated.

The light scanning device 1 is capable of scanning the display surface 500a of the screen 500 with the laser beam LL emitted from the light source unit 200 due to the actuation of the light scanners 310 and 330. Here, the laser beam LL is a laser beam obtained by combining the display light LL" as the laser beam for image display and the address light LL' as the laser beam for setting the desired area of the display surface 500a to the light diffusion state. Therefore, since the same region of the display surface 500a can be irradiated with the display light LL" and the address light LL' by the light scanning device 1, it is possible to surely irradiate the region set to the light diffusion state with the display light LL" to thereby display the desired image on the screen 500.

It should be noted that the control section 400 is configured to determine the area of the display surface 500a to be set to the light diffusion state based on the image data to be displayed on the display surface 500a of the screen 500 transmitted from the computer or the like not shown, and to control the actuation of the light source unit 200 and the light scanning device 1 so that the area thus determined is irradiated with the address light LL' and at the same time the area set to the light diffusion state due to the irradiation with the address light LL' is irradiated with the display light LL". Thus, it is possible to more reliably set only the area of the display surface 500a where the image is attempted to be displayed to the light diffusion state to thereby display the desired image on the display surface 500a.

Specifically, the image data is firstly input to the control section 400. Then, the control section 400 obtains the area (the region) of the display surface 500a to be irradiated with the display light LL" when displaying the image data thus input on the display surface 500a. Subsequently, the control section 400 drives the light scanners 310, 330 so that the area thus obtained is irradiated with the address light LL', and at the same time emits the address light LL' from the address light source 200a in accordance with (in sync with) the behavior of the movable plates 311a, 331a transmitted from the angle detection section 340.

In conjunction therewith, the control section 400 determines the color and the light intensity of the display light LL" to be irradiated with for each of the regions of the area of the display surface 500a irradiated with the display light LL" based on the image data thus input, and then emits the display light LL" from the display light source 200b in accordance with (in sync with) the behavior of the movable plates 311a, 331a based on the color information thus determined. Thus, each of the regions in the area of the display surface 500a where the image is displayed is irradiated with the laser beam LL obtained by combining the address light LL' and the display light LL" with each other.

When each of the regions in the area of the display surface 500a where the image is displayed is irradiated with the laser beam LL, the regions irradiated are changed from the light transmissive state to the light diffusion state (see FIG. 9) due to the address light LL' included in the laser beam LL. Then, since the region set to the light diffusion state is irradiated with the display light LL" included in the laser beam LL, the display light LL" thus irradiated with is reflected or diffused to thereby display the desired color. By performing the process described above in each of the regions in the area of the display surface 500a where the image is displayed, the image shown in, for example, FIG. 10 can be displayed on the display surface 500a.

It should be noted that since the screen 500 does not have a memory property, the region changed from the light transmissive state to the light diffusion state due to the irradiation with the address light LL' is restored to the light transmissive state when the irradiation with the address light LL' stops. Therefore, if the image to be displayed on the display surface 500a is a still image, for example, it is preferable to continue to draw the still image at a relatively high rate of, for example, about 60 frames per second. Thus, it is possible to display a still image without a flicker on the display surface 500a due to the residual image. Further, in the case in which the image to be displayed on the display surface 500a is a moving image, when the n-th frame has been drawn and then the subsequent frame is drawn, the image of the previous frame has been eliminated from the screen 500, and therefore, a reset process of, for example, restoring the entire area of the display surface 500a once to the light transmissive state is unnecessary. It should be noted that the time period from when the drawing of the n-th frame has been finished to when the drawing of the n+1-th frame is started is preferably set to be equal to the time required to restore the light transmissive state from the light diffusion state due to the elimination of the irradiation with the address light LL'. Thus, the moving image with preferably continued frames can be displayed.

According to the image forming device 101 having such a configuration, it is possible to provide the observer with the feeling like the image stands out as described above, and further the size of the image is switched, and therefore, it is possible to effectively make the observer have an interest in and respect to the image. Then, when switching the size of the image, the maximum deflection angle $\theta_{max}$ of the movable plate 311a is changed. The image forming device 101 is provided with the light scanning device 1 substantially the same as that of the first embodiment. Therefore, the rotation detection section 2 detects the maximum deflection angle $\theta_{max}$ of the movable plate 311a with good accuracy. Therefore, even in this case, it is possible to surely assure that the movable plate 311a is rotating with the maximum deflection angle $\theta_{max}$ within the range of a predetermined detection accuracy. Thus, it is possible to surely display the image which the observer has an interest in and respect to.

Although hereinabove, the light scanning device and the image forming device according to the invention are explained along the embodiments shown in the drawings, the invention is not limited to the embodiments, and each of the constituents of the light scanning device and the image forming device can be replaced with what can exert substantially the same function and has an arbitrary configuration. Further, it is possible to add any constituents.

The entire disclosure of Japanese Patent Application No. 2011-105012, filed May 10, 2011 is expressly incorporated by reference herein.

What is claimed is:

1. A light scanning device comprising:
a movable section having a light reflecting section adapted to reflect light, oscillating around an oscillation axis, and having a variable magnitude of a maximum deflection angle of the oscillating; and
a detection section adapted to detect the maximum deflection angle of the movable section,
wherein the detection section includes
a light source adapted to emit light to the light reflecting section,
a light receiving section adapted to receive reflected light, which is the light emitted from the light source and then reflected by the light reflecting section, and
a displacement driving section adapted to change a position of the light source in accordance with the maximum deflection angle of the movable section.

2. The light scanning device according to claim 1, wherein assuming that the maximum deflection angle is $\theta_{max}$, and an angle formed by the light source, the oscillation axis of the movable section, and the light receiving section is $2\theta_0$, the displacement driving section changes the position of the light source so that a ratio $\theta_{max}/\theta_0$ between $\theta_{max}$ and $\theta_0$ becomes constant.

3. The light scanning device according to claim 2, wherein the ratio $\theta_{max}/\theta_0$ exceeds 1, and is one of equal to and lower than 1.3.

4. The light scanning device according to claim 1, wherein the displacement driving section includes
an electric motor, and
a control section having a function of controlling an actuation of the electric motor, and
the electric motor changes the position of the light source.

5. The light scanning device according to claim 4, further comprising:
a support beam coupled to a drive shaft of the electric motor, and adapted to support the light source,
wherein the drive shaft is disposed coaxially with the oscillation axis of the movable section.

6. The light scanning device according to claim 1, wherein the displacement driving section makes a distance between the movable section and the light source constant.

7. The light scanning device according to claim 1, wherein the light receiving section is formed of a photodiode.

8. The light scanning device according to claim 1, wherein the light source emits a laser beam.

9. The light scanning device according to claim 1, wherein the screen is irradiated with the light reflected by the light reflecting section, and
the screen is scanned with the light in a predetermined direction.

10. An image forming device comprising:
the light scanning device according to claim 1,
wherein the light reflecting section scans the light to form an image with the light.

11. An image forming device comprising:
the light scanning device according to claim 2,
wherein the light reflecting section scans the light to form an image with the light.

12. An image forming device comprising:
the light scanning device according to claim 3,
wherein the light reflecting section scans the light to form an image with the light.

13. An image forming device comprising:
the light scanning device according to claim 4,
wherein the light reflecting section scans the light to form an image with the light.

14. An image forming device comprising:
the light scanning device according to claim 5,
wherein the light reflecting section scans the light to form an image with the light.

15. An image forming device comprising:
the light scanning device according to claim 6,
wherein the light reflecting section scans the light to form an image with the light.

16. An image forming device comprising:
the light scanning device according to claim 7,
wherein the light reflecting section scans the light to form an image with the light.

17. An image forming device comprising:
the light scanning device according to claim 8,
wherein the light reflecting section scans the light to form an image with the light.

18. An image forming device comprising:
the light scanning device according to claim 9,
wherein the light reflecting section scans the light to form an image with the light.

* * * * *